(12) United States Patent
Falk

(10) Patent No.: US 11,434,944 B2
(45) Date of Patent: Sep. 6, 2022

(54) FILTER ASSEMBLY

(71) Applicant: HYDAC FILTER SYSTEMS GMBH, Sulzbach/Saar (DE)

(72) Inventor: Thorsten Falk, Saarbrücken (DE)

(73) Assignee: HYDAC FILTERS SYSTEMS GMBH, Sulzbach/Saar (DE)

( * ) Notice: Subject to any disclaimer, the term of this patent is extended or adjusted under 35 U.S.C. 154(b) by 286 days.

(21) Appl. No.: 16/646,211

(22) PCT Filed: Sep. 5, 2018

(86) PCT No.: PCT/EP2018/073858
§ 371 (c)(1),
(2) Date: Mar. 11, 2020

(87) PCT Pub. No.: WO2019/052872
PCT Pub. Date: Mar. 21, 2019

(65) Prior Publication Data
US 2020/0277973 A1 Sep. 3, 2020

(30) Foreign Application Priority Data
Sep. 13, 2017 (DE) .................... 10 2017 008 580.3

(51) Int. Cl.
*F15B 21/041* (2019.01)
*G01N 1/20* (2006.01)
(Continued)

(52) U.S. Cl.
CPC ......... *F15B 21/041* (2013.01); *G01N 1/2035* (2013.01); *G01N 15/06* (2013.01); *G01N 2015/0053* (2013.01)

(58) Field of Classification Search
CPC .... F15B 21/041; G01N 1/2035; G01N 15/06; G01N 15/1459; G01N 2015/0053
(Continued)

(56) References Cited

U.S. PATENT DOCUMENTS

| 4,181,009 A | 1/1980 | Williamson |
| 2012/0103091 A1 | 5/2012 | Kleber et al. |
| 2014/0326086 A1 | 11/2014 | Wadeson et al. |

FOREIGN PATENT DOCUMENTS

| DE | 103 43 457 | 4/2005 |
| DE | 20 2009 017 886 | 8/2010 |

(Continued)

OTHER PUBLICATIONS

International Search Report (ISR) dated Dec. 13, 2018 in International (PCT) Application No. PCT/EP2018/073858.
(Continued)

*Primary Examiner* — Thomas E Lazo
*Assistant Examiner* — Daniel S Collins
(74) *Attorney, Agent, or Firm* — Wenderoth, Lind & Ponack, L.L.P.

(57) ABSTRACT

A filter assembly, in particular used as a portable service unit for hydraulic applications, has a motor-pump unit (8) with one outlet (14) connected to a filter element (18) in the main flow. Another other outlet (26) of the motor-pump unit is connected to a device for measuring particles in the fluid in a bypass flow having a particle sensor (36). As a component of the device for measuring particles, a fluid line (38) of predeterminable length as a stilling section is on the inflow side of the particle sensor (36) in such a way that gases carried along in the fluid re-dissolve in the fluid. The fluid line (38) of predeterminable length is accommodated in a housing part (52) of the assembly, combined to form at least one winding.

11 Claims, 3 Drawing Sheets

(51) Int. Cl.
*G01N 15/06* (2006.01)
*G01N 15/00* (2006.01)

(58) Field of Classification Search
USPC .......................................................... 60/545
See application file for complete search history.

(56) References Cited

FOREIGN PATENT DOCUMENTS

| | | |
|---|---|---|
| DE | 10 2009 048 271 | 4/2011 |
| EP | 0 602 416 | 6/1994 |
| EP | 0 427 908 | 9/1994 |
| WO | 2010/142403 | 12/2010 |
| WO | 2014-026733 | 2/2014 |

OTHER PUBLICATIONS

"Filteraggregat OF7" niehues, Hydac International, Retrieved from the Internet: https://www.niehues.com/userfiles/image/datenblaet_ter/ek-vk2/0203-hydac/020301-filter/02030106-mobile-filteraggregate/0203010601-hydac-mobiles-service-filter-aggregat-of-7-d7940-de.pdf [retrieved on Dec. 4, 2018] XP055530097, pp. 1-4, Mar. 31, 2017.

FILTER ASSEMBLY

FIELD OF THE INVENTION

The invention relates to a filter assembly, in particular used as a portable service unit for hydraulic applications, at least comprising a motor-pump unit. One outlet of the motor-pump unit is connected to a filter element in the main flow. The other outlet of the motor-pump unit is connected to a device for measuring particles in the fluid in the bypass flow, which device has a particle sensor. As a component of the device for measuring particles, a fluid line of predeterminable length as a stilling section on the inflow side of the particle sensor in such a way that gases carried along in the fluid re-dissolve in the fluid.

BACKGROUND OF THE INVENTION

A filter assembly of this type having the product designation OF7CM is known from the applicant's brochure D7.940.5/02.15. Such filter assemblies can be used in filling hydraulic systems, in flushing small hydraulic systems and in cleaning them in bypass applications. The portable design also permits the use for temporary bypass filtration of hydraulic systems. At the same time, the particle measurement device permits the fluid to be monitored for contamination by solids. State of the art particle counters are used for this purpose, which operate based on the opacity method. As disclosed in document EP 0 427 908 B1, the counting of opaque particles in a fluid flow is performed by a light barrier whose light beam passes through a measuring channel for the fluid. Evaluation electronics are installed downstream of the receiver of the light barrier. The accuracy of the counting result is impaired if there are undissolved gas components carried along in the fluid. The bubbles of those gas components cause the optical particle counter erroneously to detect those bubbles as contamination of the fluid owing to the different refractive indices of gases (air) and medium. Therefore, as stated in document DE 103 43 457 C5, it is state of the art to provide a fluid line in the flow path upstream of the particle sensor having a length sufficient to act as a stilling section. Within the stilling section, gases carried along in the fluid, such as air, are re-dissolved. This re-dissolving means that any gas or air input is no longer detected as contamination of the fluid, avoiding misinterpretations regarding the quality of the fluid.

SUMMARY OF THE INVENTION

Based on this state of the art, the invention addresses the problem of providing a filter assembly of the type mentioned at the outset, which is characterized by a particularly compact design.

According to the invention, this object is basically achieved by a filter assembly having, as an essential feature of the invention, the fluid line of a pre-determinable length being accommodated in a housing part of the assembly, combined to form at least one winding. In comparison to the aforementioned known filter assembly, in which the fluid line forming the stilling section is attached to the outside of the assembly in the form of a hose line having a length of 2.5 m, a line coil can be used to implement a stilling section of a corresponding length in a particularly compact design. If the line is wound into a coil, it can be integrated into the assembly itself, eliminating the surrounding space required for an external hose section.

Advantageously the respective winding is formed by a helix inside the housing part.

In particularly advantageous exemplary embodiments, there are two helices in the housing part, which are separated by a housing wall in a sealing manner except for a common fluid connection point. The flow is routed through both helices in sequence. For helices adjacent to each other along one housing wall, a long pipe length in a particularly flat design can be achieved.

It may be advantageous to arrange the helices in such a way that, when accommodated in the housing part, one helix faces the particle sensor and the other helix faces away, and that the particle sensor is mounted on the housing part.

Advantageously the flow is routed through the helix facing away from the particle sensor from the outside to the inside towards one end of the helix. At a point of passage in the sealing housing wall, this end merges into one end of the other helix facing the particle sensor. The flow through the other helix is routed from the inside to the outside, and passes the fluid from the stilling section to the particle sensor.

In advantageous exemplary embodiments, a further filter element is installed between the output of the stilling section and the input of the particle sensor. After the coarse contamination has been removed, the particle sensor detects the fine contamination of the fluid.

For pressurizing the stilling section, a counterbalance valve can be installed downstream of the particle sensor, for example in the form of a spring-loaded non-return valve.

In advantageous exemplary embodiments, the motor-pump unit has two hydraulic pumps ensuring the fluid supply in the main flow and in the bypass flow.

A pressure relief valve can be installed in a bypass branch downstream of the outlet of the bypass hydraulic pump, which pressure relief valve secures the stilling section located in the bypass and in that way the particle sensor.

The output of the main hydraulic pump can be protected by a counterbalance valve in the branch, which, like the counterbalance valve of the bypass flow, can be a spring-loaded non-return valve.

Viewed in the direction of the fluid flow, a fluid connection is downstream of the filter element located in the main flow. The fluid connection preferably is provided with a throttle or orifice, and can be routed to the inlet side of the main hydraulic pump, serving as dry-run protection. The provision of the dry-run protection prevents the assembly from being damaged if there is no fluid in the pump. In this way, the containers can be emptied without risk. This arrangement also renders the assembly suitable for extracting leakage oil.

Advantageously the main flow and the bypass hydraulic pump can be implemented using a single vane pump, which can be designed as a dual pump.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
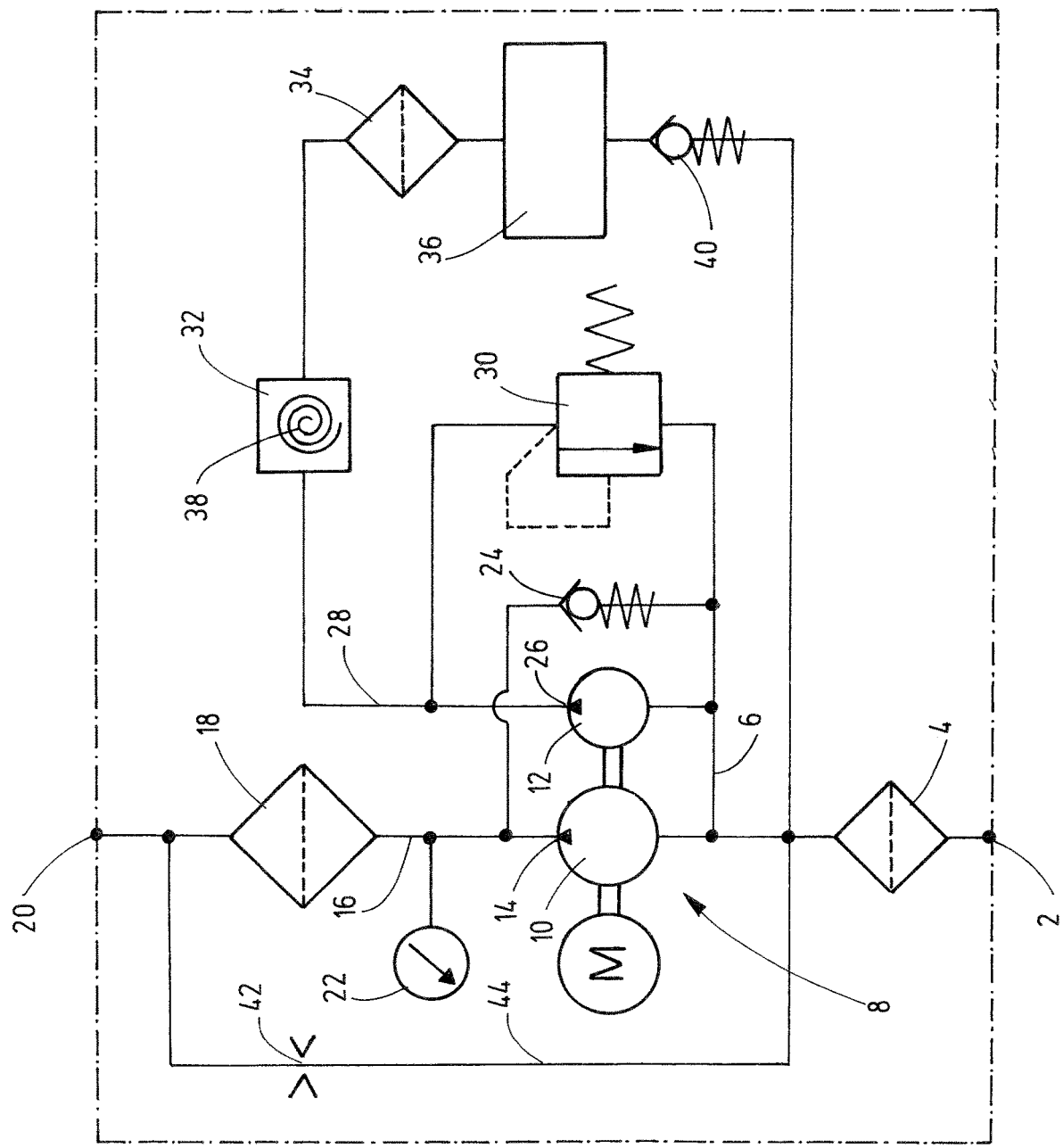
FIG. 1 is a diagram of the fluid circuit of a filter assembly according to an exemplary embodiment of the invention.

In FIG. 1, a suction connection 2 on the inlet side is connected to the inlet side 6 of a motor-pump unit 8 via a protective screen 4. Suction connection 2 has a main flow hydraulic pump 10 and a bypass hydraulic pump 12, each formed by a vane pump. This example is a dual pump of a known type formed of fixed displacement pumps driven by an electric motor and having a joint shaft. Each pump has a different delivery volume per revolution. Such pumps are commercially available under the name PVF101 (see the applicant's pump product overview D2.902.5/11.14). A main flow line 16 connected to the outlet 14 of the main flow pump 10 is routed to the assembly outlet connection 20 via a filter element 18 forming a particle filter. A pressure gauge 22 as a contamination indicator is connected to the main flow line 16 upstream of the inlet of the filter element 18. Furthermore, the main flow line 16 is protected towards the inlet side 6 by a spring-loaded non-return valve 24 acting as a pressure relief valve. A bypass line 28 is connected to the outlet 26 of the bypass pump 12, which, like the main flow line 16, is protected against overpressure towards the inlet side 6. A pressure relief valve 30 is provided for the bypass line 28, which pressure relief valve limits the pressure of the bypass line 28 to a range of approx. 3 bar. Via a stilling section 32 and a second filter element 34, the bypass line 28 is routed to the particle sensor in the form of a particle counter 36, which operates based on the opacity principle. The stilling section 32 is formed by two line helices 38, as explained in more detail below with reference to FIGS. 2 and 3. The circuit of FIG. 1 is completed by a spring-loaded non-return valve 40, which forms a preload in the stilling section 32 and connects the output of the particle counter 36 to the input end 6 of the motor-pump unit 8. In addition, as dry-run protection, a protective line 44 provided with a throttling orifice 42 is routed back from the output connection 20 to the input side 6 of the motor-pump unit 8.

Figure 2:
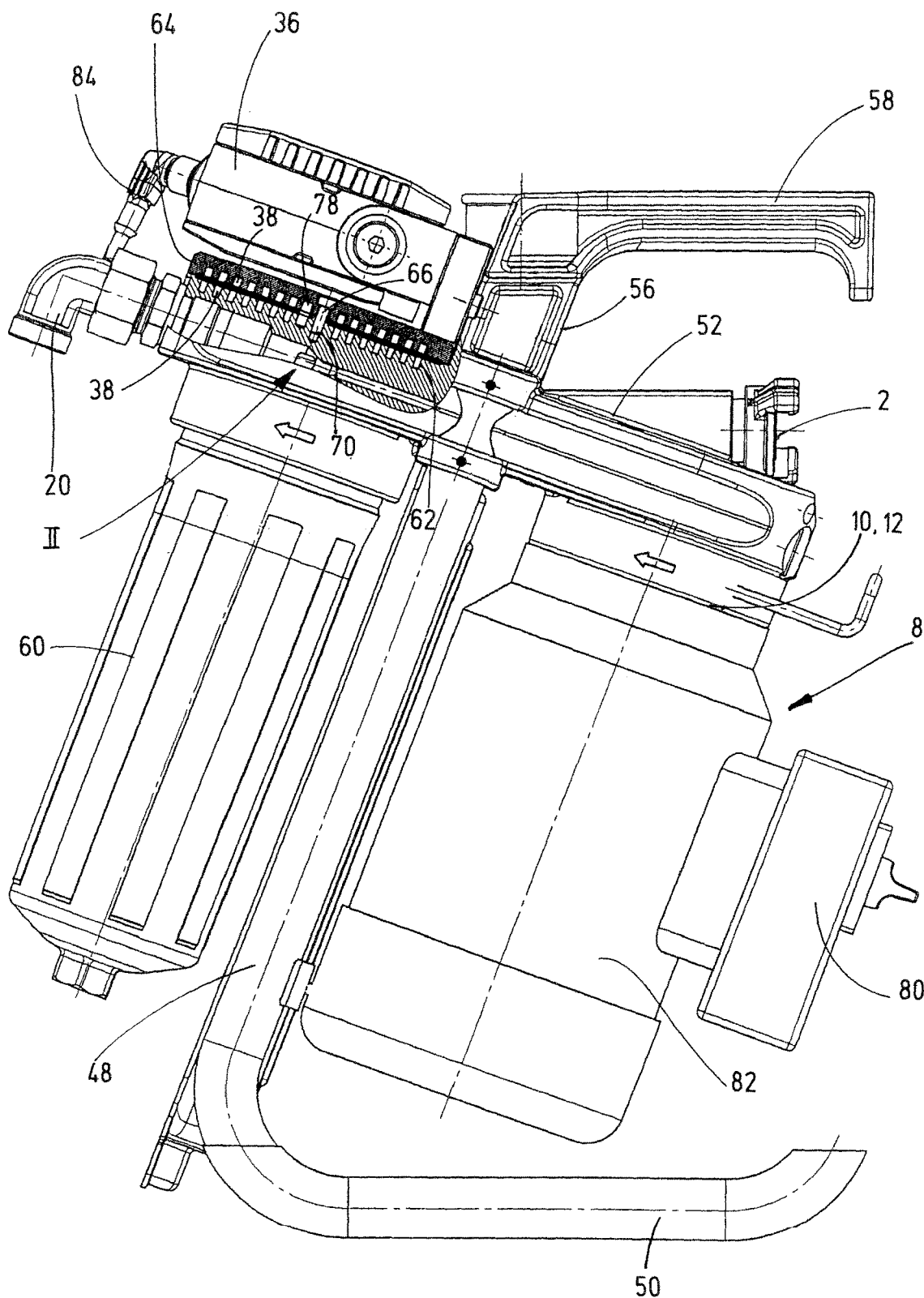
FIG. 2 is a perspective view of the exemplary embodiment, wherein a wall area designated by II is shown cut away.
Figure 3:
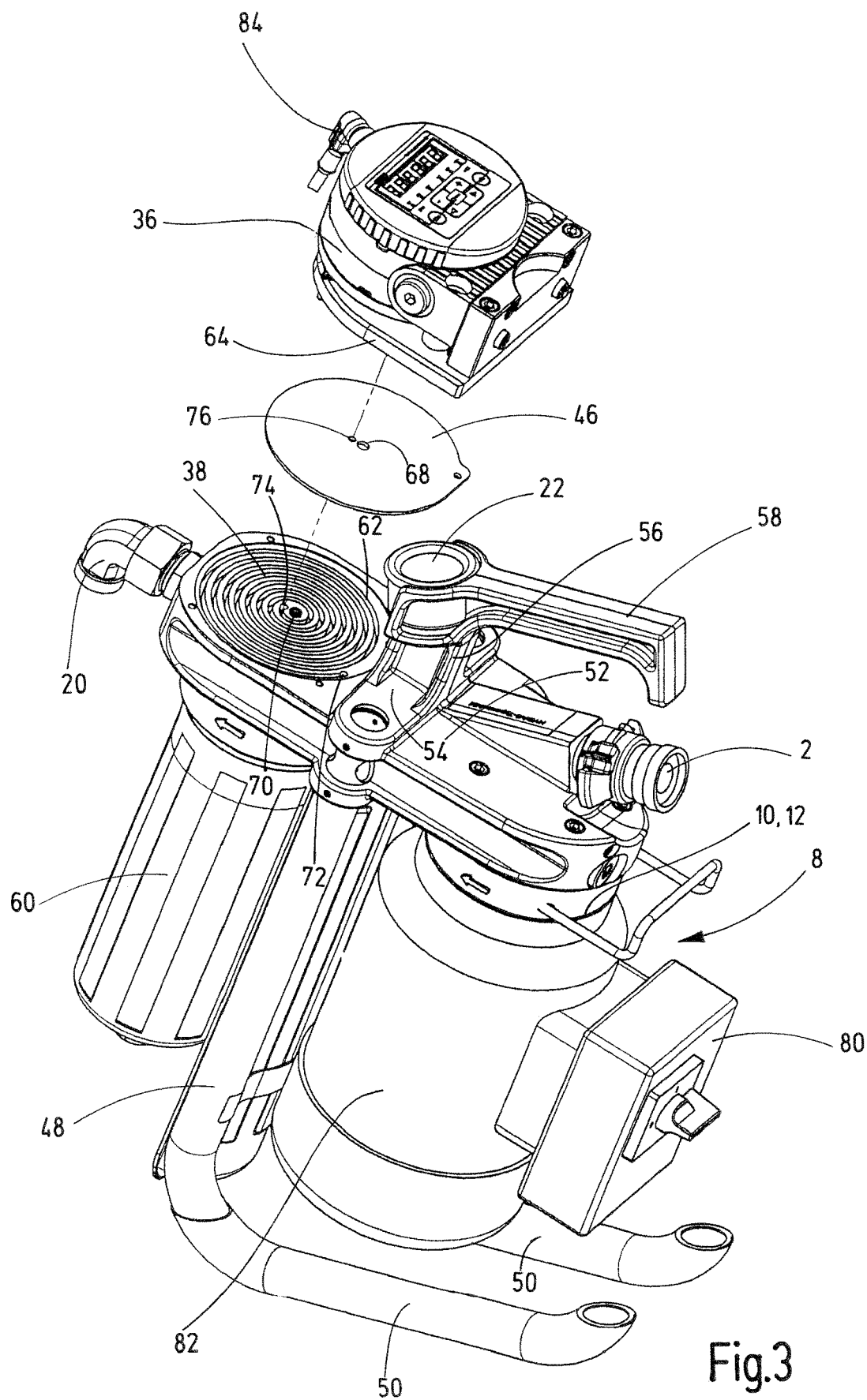
FIG. 3 is a perspective view of the exemplary embodiment viewed from above, wherein a particle counter and a wall part are shown separated from the unit housing in the manner of an exploded view.

In FIGS. 2 and 3, the exemplary embodiment of the filter assembly according to the invention is shown as a view of the outside of the assembly housing. With the exception of partial areas with a closed outer wall, only parts of the elements of the fluid circuit shown in FIG. 1 assigned to the stilling section 32 are visible. To be more precise, in FIG. 2 the housing is closed except for a section marked II, which has been cut away, and in FIG. 3 only the particle counter 36 is shown with an associated wall section 46 in a position raised from the otherwise closed assembly housing. The assembly housing has a centrally located frame having two parallel bars spaced apart in the form of round pipes 48. The bent tube ends 50 of which form stand feet, which can be used to place the assembly on a surface. The round pipes 48 extend upwards from the tube ends 50 forming the stand feet at a slight inclination. The round pipes 48 form an angle of 70° with the tube ends 50. The upper ends of the round pipes 48 are connected to a housing part in the form of a cover part 52, which extends as a traverse having a narrow box shape perpendicular to the round pipes 48. From the round pipes 46, one wing of cover part 52 extends to one side and the other wing of cover part 52 extends to the other side. Above the cover part 52, a band-like traverse 54, from the center of which an attachment 56 projects upwards, to which a handle 58 is attached, extends between the ends of the round pipes 48. The housing 60 of the filter element 18 is installed below the wing of the cover part 52, which adjoins the traverse 54 and extends leftward in FIGS. 2 and 3. The motor-pump unit 8 is installed below the wing of cover part 52 extending to the right from traverse 54. The fluid guides shown in FIG. 1 includes the associated circuit elements by which the fluid circuit is formed. The fluid circuit extends between the suction port 2, which is located below the handle 58 on the cover part 52, and the outlet port 20, which is located at the left-hand end of the cover part 52. The fluid guides and circuit are routed inside the box-like cover part 52.

The stilling section 32 is formed by two helices 38, of which the one helix 38 visible in FIG. 3 is held in a flat plate-shaped recess 62 in the top of the left-hand wing of the cover part 52. The second helix 38, not visible in FIG. 3, is held in a similar way in a base plate 64, which forms the support of the particle counter 36 mounted thereon. The helices 38 are separated from each other by the wall part 46 therebetween, which forms a closure part for the recess 62 in the cover part 52. As FIG. 2 shows, the base plate 64 of the particle counter 36 is penetrated by a retaining bolt 66, which is bolted to a threaded bore 70 in the cover part 52 via a central bore 68 in the wall part 46.

During operation, the flow is routed through the two helices 38 in sequence. The flow path runs from the outer end 72 of the first or lower helix 38 located in the cover part 52, to its inner end 74. The flow path continues to the inner end of the second or upper helix 38 located in the base plate 64 via a point of passage 76 located in the wall part 46 next to the drilled hole 68. The fluid flows through this second helix from the inside to its outer end, from where the fluid reaches the particle counter 36. From there, the bypass circuit continues via the valve 40 to the inlet side 6. The inflow to the end 72 of the lower helix 38 (FIG. 3) forming the start of the bypass circuit occurs from the upper vane pump 12 of the motor-pump unit 8 via an internal fluid line in the cover part 52. In FIG. 2 the fluid connection point 78 provide a connection, via which the inner end 74 of the lower helix 38 is connected to the inner end of the upper helix 38 via the passage 76.

The outlet 14 of the lower vane pump 10 forming the main flow pump is routed to the housing 60 of the filter element 18, whose clean-side outlet is routed to the outlet connection 20 via a fluid guide forming the main flow line 16 in the cover part 52. As shown, the filter housing 60 forms a type of cartridge filter of the bolted type. The protective line 44 in FIG. 1 is re-routed via the inside of the cover part 52 from the outlet connection 20 to the inlet side 6 of the motor-pump unit 8. In FIGS. 2 and 3, an actuating switch 80 is for the electric motor 82 of the motor-pump unit 8. The pumps 10 and 12 of the motor-pump unit are arranged as dual vane cell pumps above the electric motor 82 and are attached directly to the underside of the cover part 52. Furthermore, the electrical connection 84 of the particle counter 36 is shown in FIGS. 2 and 3.

While one embodiment has been chosen to illustrate the invention, it will be understood by those skilled in the art that various changes and modifications can be made therein without departing from the scope of the invention as defined in the claims.

The invention claimed is:

1. A filter assembly, comprising:
a housing part;
a motor-pump unit having first and second outlets;
a filter element connected in fluid communication to the first outlet in a main flow line;
a particle sensor connected in fluid communication to a particle measurer in a bypass flow line; and
a fluid line of predeterminable length capable of functioning as a stilling section on an inflow side of the particle sensor, the fluid line being capable of re-dissolving gases in liquid conveyed through the fluid line and having first and second helices in the housing part and being separated by a housing wall in a sealing manner except for a common connection point connecting the first and second helices sequentially in fluid communication.

2. A filter assembly according to claim 1 wherein
in the housing part, the first helix faces the particle sensor, the particle sensor being mounted on the housing part.

3. A filter assembly according to claim 2 wherein
the second helix is routed from an outer end to an inner end of the second helix, the inner end of the second helix merging into an end of the first helix at a passage point in the housing wall, the outer end of the second helix being connected in fluid communication with the particle sensor such that the fluid flows through the second helix from the inner end to the outer end.

4. A filter assembly according to claim 1 wherein
a further filter element is in fluid communication with and between an output of the stilling section and an input of the particle sensor.

5. A filter assembly according to claim 1 wherein
a counterbalance valve is in fluid communication with and is downstream of the particle sensor pressurizing the stilling section.

6. A filter assembly according to claim 1 wherein
the motor-pump unit comprises first and second hydraulic pumps safeguarding fluid supply in the main flow line and the bypass flow line, respectively.

7. A filter assembly according to claim 6 wherein
a pressure relief valve is in a secondary branch line downstream of the second hydraulic pump.

8. A filter assembly according to claim 6 wherein
an outlet of the first hydraulic pump is protected by a counterbalance valve in the bypass flow line.

9. A filter assembly according to claim 6 wherein
a fluid connection line connects the main flow line downstream of the filter element with an inlet side of the first hydraulic pump serving as a dry-run protection.

10. A filter assembly according to claim 9 wherein
the fluid connection line has a throttle therein.

11. A filter assembly according to claim 6 wherein
the first and second hydraulic pumps are implemented using a single vane pump.

* * * * *